United States Patent
Robert et al.

(10) Patent No.: US 10,734,629 B2
(45) Date of Patent: Aug. 4, 2020

(54) BUSBAR INTERCONNECT ASSEMBLY FOR VEHICLE TRACTION BATTERY

(71) Applicant: Ford Global Technologies, LLC, Dearborn, MI (US)

(72) Inventors: Brian Joseph Robert, St. Clair Shores, MI (US); Thomas P. Brackett, Dearborn, MI (US); James Maurice Boileau, Novi, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 59 days.

(21) Appl. No.: 15/903,610

(22) Filed: Feb. 23, 2018

(65) Prior Publication Data
US 2019/0267600 A1  Aug. 29, 2019

(51) Int. Cl.
*H01M 2/20* (2006.01)
*H01M 10/0525* (2010.01)
*H01M 2/30* (2006.01)

(52) U.S. Cl.
CPC ......... *H01M 2/206* (2013.01); *H01M 2/305* (2013.01); *H01M 10/0525* (2013.01); *H01M 2220/20* (2013.01)

(58) Field of Classification Search
None
See application file for complete search history.

(56) References Cited

U.S. PATENT DOCUMENTS

| 6,155,889 A | * | 12/2000 | Scarla | H01R 11/283 439/760 |
| 7,879,487 B2 | | 2/2011 | Bechtold et al. | |
| 7,900,812 B2 | * | 3/2011 | Teets | B23K 20/002 228/261 |
| 8,557,434 B2 | | 10/2013 | Taniguchi et al. | |
| 2015/0072207 A1 | * | 3/2015 | Soleski | H01M 10/486 429/121 |
| 2015/0333312 A1 | * | 11/2015 | Nakamoto | H01M 2/206 429/153 |
| 2016/0099440 A1 | | 4/2016 | Park et al. | |
| 2017/0250388 A1 | | 8/2017 | Unno et al. | |

FOREIGN PATENT DOCUMENTS

WO  2014023541 A1  2/2014

* cited by examiner

*Primary Examiner* — Jonathan G Leong
*Assistant Examiner* — Kirsten B Tysl
(74) *Attorney, Agent, or Firm* — David Kelley; Brooks Kushman PC (57) ABSTRACT

A vehicle traction battery assembly including a battery cell, a busbar, and a thermal spray is provided. The battery cell may include a terminal having an angled taper upper portion extending therefrom. The busbar may define a through-hole having a taper defining an angle substantially opposite of the angled taper upper portion such that a cavity is defined therebetween when the terminal extends through the through-hole. The thermal spray may be deposited within the cavity to secure the busbar to the terminal. The thermal spray may be formed from a metallic powder selected to include particles that deform and connect when accelerated to a speed of approximately 500 mph or more to join the particles and form a bond securing the terminal to the busbar. The particles of the metallic powder may be iron, copper, aluminum, nickel, iron, or magnesium.

6 Claims, 6 Drawing Sheets

BUSBAR INTERCONNECT ASSEMBLY FOR VEHICLE TRACTION BATTERY

TECHNICAL FIELD

This disclosure relates to interconnections between electrodes and busbars of vehicle traction batteries.

BACKGROUND

Rigid case lithium-ion battery cells, such as a prismatic cell or cylindrical cell, are an example of a battery cell for a traction battery of an electrified vehicle. Electrode-to-busbar interconnections within the rigid case lithium-ion battery cells assist in providing efficient electrical performance for full-hybrid electric vehicles (FHEV), partial-hybrid electric vehicles (PHEV), and battery electric vehicles (BEV). A quality of mating between interface connections influences contact resistances, bond degradation, and traction battery performance.

SUMMARY

A vehicle traction battery assembly includes a battery cell, a busbar, and a thermal spray. The battery cell includes a terminal having an angled taper upper portion extending therefrom. The busbar defines a through-hole having a taper defining an angle substantially opposite of the angled taper upper portion such that a cavity is defined therebetween when the terminal extends through the through-hole. The thermal spray is deposited within the cavity to secure the busbar to the terminal. The thermal spray may be formed from a metallic powder selected to include particles that deform and connect when accelerated to a speed of approximately 500 mph or more to join the particles and form a bond securing the terminal to the busbar. The particles of the metallic powder may be iron, copper, aluminum, nickel, iron, or magnesium. The thermal spray may be deposited within the cavity such that an upper surface of the busbar and an upper surface of the deposited thermal spray are substantially flush within one another. The angled taper upper portion and the taper of the through-hole may each define an angle of between zero and ninety degrees. The tapers may be arranged with one another such that the busbar is spaced from an isolator block mounted to the battery cell when the terminal extends through the through-hole.

A vehicle traction battery assembly includes a battery cell, a busbar, and a thermal spray bond. The battery cell has a terminal. The busbar defines a through-hole to receive the terminal and includes an alignment cap mounted adjacent the through-hole to translate between a first position and a second position in which the alignment cap contacts the terminal. The thermal spray bond is applied to secure the alignment cap in the second position to the terminal and such that the thermal spray bond does not contact other portions of the busbar. The thermal spray bond may be applied in a predetermined pattern selected based on mechanical support requirements related to mounting the terminal to the busbar. The predetermined pattern may be a shape resembling a circle disposed between four crescent-moons, four rectangular sections defining an X-pattern, a collection of triangles adjacent one another, or a circular burst. The battery cell may be a rigid prismatic battery cell or a cylindrical battery cell. The thermal spray may be of a material having a melting point substantially equal to a temperature associated with a terminal heat failure condition such that the thermal spray operates as a fuse to disconnect electrical communication between the busbar and terminal when subjected to the temperature associated with the terminal heat failure condition. The thermal spray bond may be applied to an upper surface of the terminal and an upper surface of the alignment cap. Portions of the busbar and the terminal may be mechanically bonded to one another via force applications from a crimp tool.

A traction battery assembly includes a battery cell, a busbar, and a thermal spray. The battery cell has a terminal. The busbar defines a through-hole shaped to correspond to a shape of the terminal. The thermal spray secures the terminal to the busbar. The terminal and busbar include surfaces defining a first contact region. The thermal spray is applied to the terminal and busbar to define a second contact region having an area greater than an area of the first contact region. The through-hole may be shaped to have an irregular or regular arc-shape portion corresponding to a housing corner shape of the battery cell. The area of the second contact region may provide a higher level of electrical conductivity than the area of the first contact region. The busbar may further define a trough about the through-hole. The trough may be sized to receive the thermal spray such that an upper surface of the thermal spray is substantially flush with an upper surface of the busbar. The through-hole may define a slot shape and the terminal may define a corresponding block shape. The thermal spray may be of a material having a melting point substantially equal to a temperature associated with a terminal heat failure condition such that the thermal spray operates as a fuse to terminate electrical communication between the busbar and terminal when subjected to the temperature associated with the terminal heat failure condition. The first contact region may include a material layer to prevent electrical communication between the busbar and terminal when a terminal temperature reaches the temperature associated with the terminal heat failure condition.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present disclosure. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
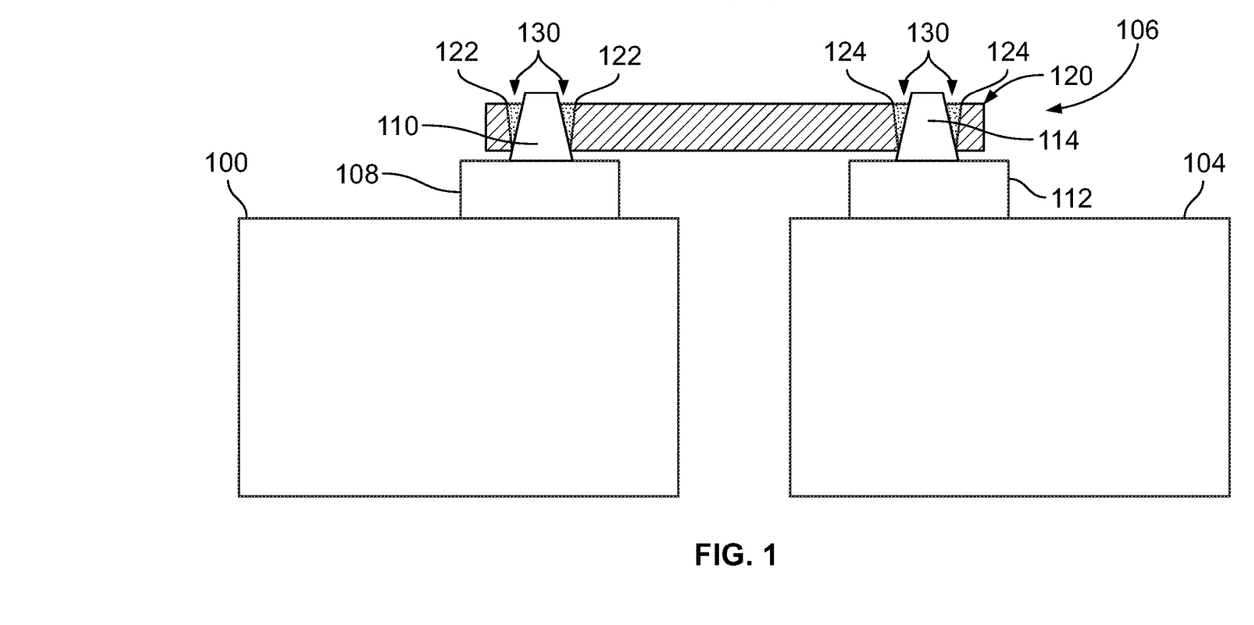
FIG. 1 is a front view, in cross-section, of an example of a portion of a traction battery assembly.
Figure 2:
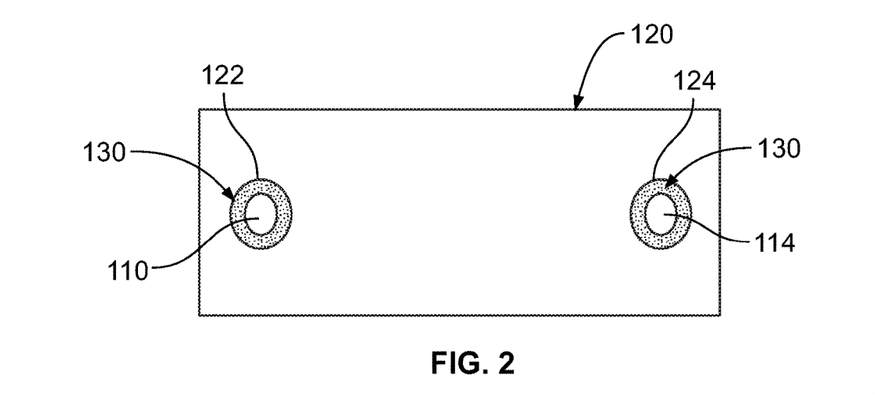
FIG. 2 is a top plan view of a portion of the traction battery assembly of FIG. 2A.

FIGS. 1 and 2 illustrate portions of an example of a traction battery of a vehicle. The traction battery includes a first battery cell 100, a second battery cell 104, and a busbar assembly 106 electrically connecting the battery cells to one another. The first battery cell 100 includes a first isolation block 108 and a first terminal 110. The second battery cell 104 includes a second isolation block 112 and a second terminal 114. The busbar assembly 106 includes a busbar 120 for electrically connecting the first battery cell 100 and the second battery cell 104. The busbar 120 defines a first through-hole 122 and a second through-hole 124.

The first through-hole 122 may be sized for the first terminal 110 to extend therethrough and the second through-hole 124 may be sized for the second terminal 114 to extend therethrough. Each of the first through-hole 122 and the second through 124 may be shaped with a taper. Each of the first terminal 110 and the second terminal 114 may be shaped with a taper. The tapered shapes of the through-holes and terminals may be shaped opposite one another to assist in aligning each terminal with a respective through-hole for extending therethrough. The tapered shapes of the through-holes and terminals may also be shaped such that the busbar 120 is spaced from the isolator blocks mounted to respective battery cells when respective terminals extend through respective through-holes.

The tapers of the through-holes and terminals may also be sized to define a cavity between a respective terminal and respective side of a through-hole to provide space for a thermal spray to be applied within each of the cavities. In one example, an angle of each of the tapers may be approximately between zero and ninety degrees. Each of the tapers may assist in promoting a pressure fit between the busbar 120 and a respective terminal as well as providing additional surface area to facilitate an enhanced thermal spray interface between the busbar 120 and the respective terminal. The thermal spray may assist in providing a mechanical connection and an electrical connection between the busbar 120 and each of the first terminal 110 and the second terminal 114.

A thermal spray application apparatus (not shown) may selectively distribute the thermal spray. For example, a reservoir of the thermal spray application apparatus may contain a metallic powder. Examples of materials for the metallic powder include iron, copper, aluminum, nickel, iron, and magnesium. The thermal spray application apparatus may accelerate portions of the metallic powder to a high speed. In one example, the spray application apparatus may accelerate the portions of the metallic powder to approximately 500 miles per hour, and then distribute the accelerated portions via a nozzle, now in a thermal spray form, to a selected area of a battery cell assembly, such as an interconnection area between a battery terminal and a busbar. Upon contact with a surface of the interconnection area, the accelerated portions may deform, distort, and mechanically connect with one another and to the surface to provide a bonded connection. This process of applying the thermal spray is a cold process that does not require heat. As such, issues that may arise with heat and metallic components of the battery cell assembly may be eliminated.

In one example, a thermal spray, represented by a thermal spray 130 may be disposed within each of the cavities defined between the terminals of the battery cell first and the busbar 120. The thermal spray 130 may be formed from a metallic powder having electrically conductive properties. The thermal spray 130 may assist in mechanically connecting the busbar 120 to each of the first terminal 110 and the second terminal 114 via a bond and may assist in facilitating an electrical connection between the busbar 120 and each of the first terminal 110 and the second terminal 114. The thermal spray 130 may be deposited within the cavities in a manner such that the thermal spray 130 is flush with an upper surface of the busbar 120 and such that a portion of each of the first terminal 110 and the second terminal 114 extends through the thermal spray 130. Alternatively, the thermal spray may fully cover each of the first terminal 110 and the second terminal 114.

Figure 3A:
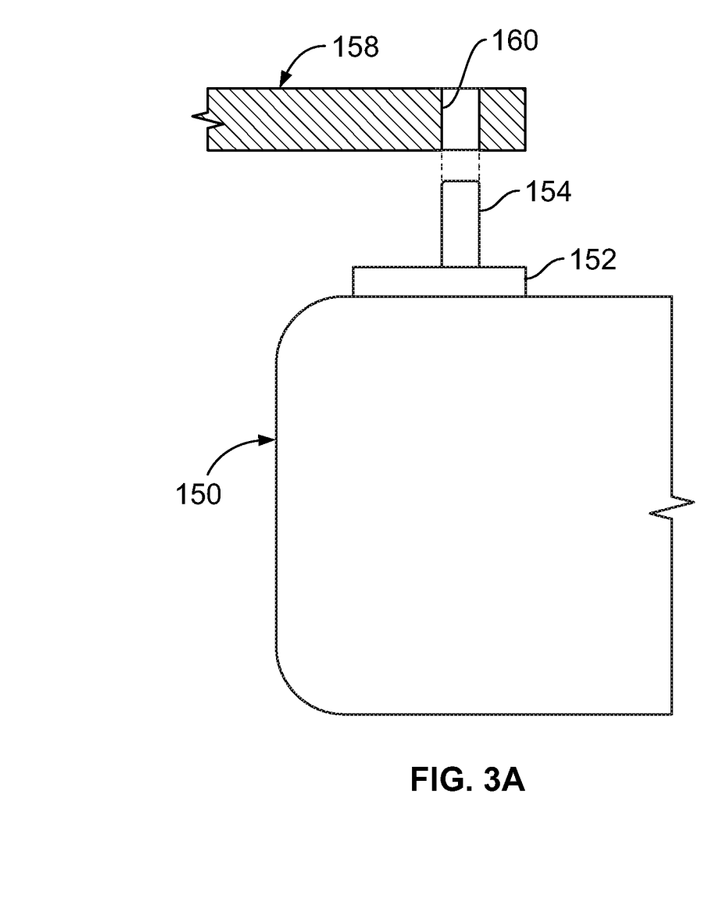
FIG. 3A is a front view, in cross-section, of an example of a portion of a traction battery assembly.
Figure 3B:
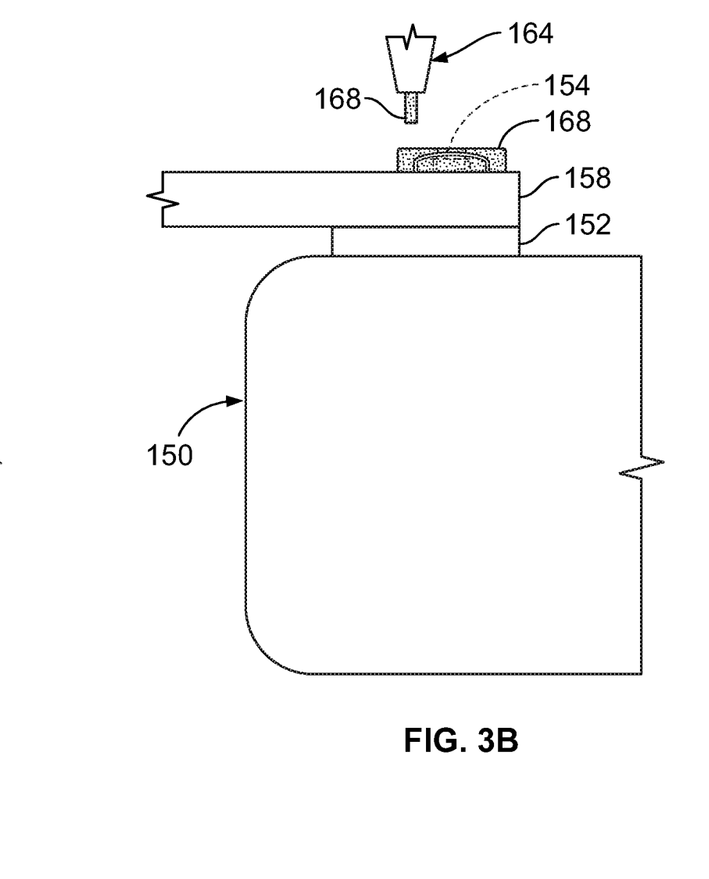
FIG. 3B is a front view of the portion of the traction battery assembly of FIG. 3B showing a thermal spray applied to a terminal and busbar interconnection area.

FIGS. 3A and 3B illustrate another example of a portion of a vehicle traction battery. A battery cell 150 may include an isolation block 152 and a terminal 154. A busbar 158 may define a through-hole 160 sized for the terminal 154 to extend therethrough to assist in aligning the busbar 158 and the terminal 154 for electrical interconnection. In FIG. 3B, the busbar 158 is shown mounted to the battery cell 150 with the terminal 154 extending within the busbar 158. A nozzle 164 of a thermal spray application apparatus is shown adjacent the busbar 158. The thermal spray application apparatus may be arranged with the busbar 158 to selectively distribute an amount of thermal spray 168 thereupon. The thermal spray 168 may assist in bonding the terminal 154 to the busbar 158 while facilitating electrical communication therebetween.

Figure 4A:
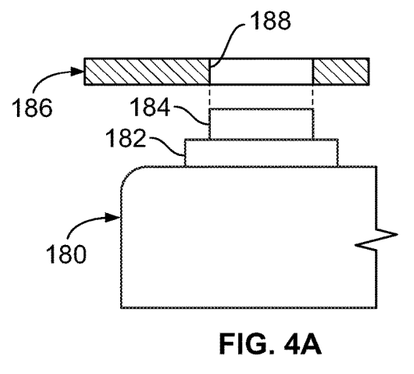
FIG. 4A is a front view, in cross-section, of an example of a portion of a traction battery assembly.
Figure 4B:
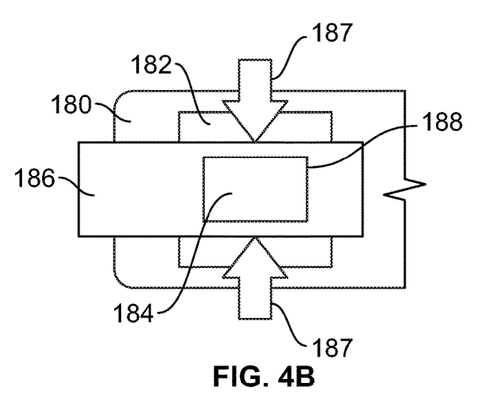
FIG. 4B is a top plan view of the portion of the traction battery of FIG. 4A.
Figure 4C:
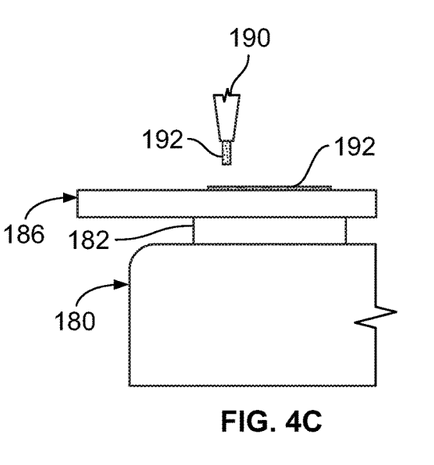
FIG. 4C is a front view of the portion of the traction battery assembly of FIG. 4A showing a thermal spray applied to a terminal and busbar interconnection area.

FIGS. 4A through 4C illustrate another example of a portion of a traction battery. In this example, a battery cell 180 may include an isolation block 182 and a terminal 184. A busbar 186 may define a slot through-hole 188 for the terminal 184 to extend therethrough to assist in aligning the busbar 186 with the terminal 184. The slot through-hole 188 may be slot-shaped and correspond to a block-shape of the terminal 184. It is contemplated that the terminal 184 and the slot through-hole 188 may defined tapered shapes similar to the terminals and through-holes as described above and relating to the embodiment shown in FIGS. 1 and 2.

In FIG. 4B, the busbar 186 is shown mounted to the battery cell 180 with the terminal extending within the busbar 186. Force arrows 187 shown in FIG. 4B may represent forces, such as mechanical crimping forces, applied to the busbar 186 to mechanically secure the busbar 186 to the terminal 184. A crimp tool may apply the crimping force during assembly of a traction battery assembly. The crimping forces may be applied at a force sufficient to secure the busbar 186 to the terminal 184 based on a type of material of each.

In FIG. 4C, the busbar 186 is shown mounted to the battery cell 180 with the terminal 184 extending within the busbar 186. A nozzle 190 of a thermal spray application apparatus may apply a thermal spray 192 to secure the busbar 186 to the terminal 184. In FIG. 4C, the thermal spray 192 is shown as extending above a surface of the busbar 186, however it is contemplated that the thermal spray 192 may be applied in such a manner that the thermal spray 192 is flush with a surface of the busbar 186.

Figure 5A:
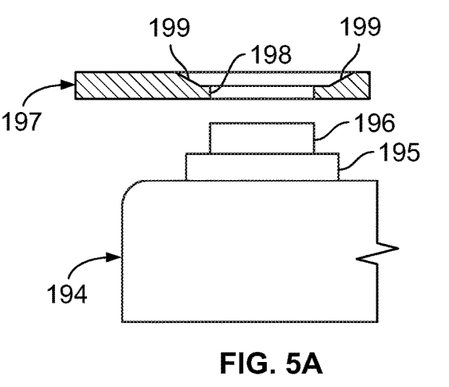
FIG. 5A is a front view, in cross-section, of an example of a portion of a traction battery assembly.
Figure 5B:
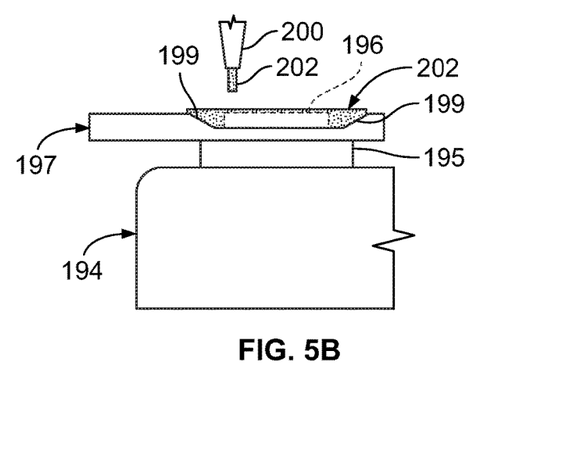
FIG. 5B is a front view of the portion of the traction battery assembly of FIG. 5A showing a thermal spray applied to a terminal and busbar interconnection area.

FIGS. 5A and 5B illustrate another example of a portion of a vehicle traction battery assembly. A battery cell 194 may include an isolation block 195 and a terminal 196. A busbar 197 may include a slot through-hole 198 defined within a trough portion. The trough portion may be defined between angled portions 199. The slot through-hole 98 may be sized to receive the terminal 196.

In FIG. 5B, the busbar 197 is shown mounted to the battery cell 194 with the terminal 196 extending through the busbar 197. A nozzle 200 of a thermal spray application apparatus may apply a thermal spray 202 to secure the busbar 197 to the terminal 196. In this example, the trough of the busbar assists in providing more accessible surface area of the terminal 196 for the thermal spray 202 to secure the busbar 197 to the terminal 196. For example, the terminal 196 and the busbar 197 may include surfaces defining a first contact region. The applied thermal spray 202 may be applied to the terminal 196 and busbar 197 to define a second contact region having an area greater than an area of the first contact region to assist in providing optimal conductivity conditions. The thermal spray 202 may be applied such that a portion of the terminal 196 extends therethrough or such that the terminal is completely covered. The thermal spray 202 may be applied such that a portion of the thermal spray 202 extends above a surface of the busbar 197 or such that an upper surface of the thermal spray 202 is substantially flush with a surface of the busbar 197.

A type of a thermal spray may be selected based on physical properties thereof. For example, a material for a thermal spray may be selected having a melting point less than a melting point of a terminal of which the thermal spray is applied. The thermal spray may have a melting point equivalent to a temperature associated with an amount of current flowing through a terminal under a failure condition such that the thermal spray may operate as a fuse of sorts.

Figure 6A:
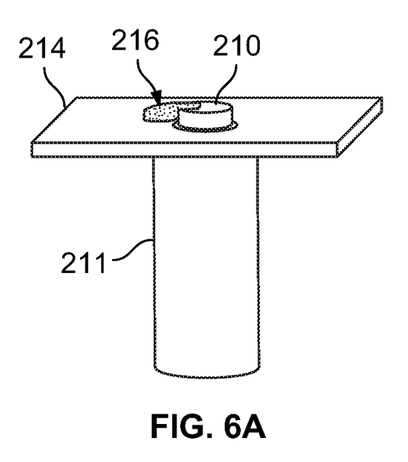
FIG. 6A is a perspective view of an example of a busbar secured to a terminal via a thermal spray deposit.
Figure 6B:
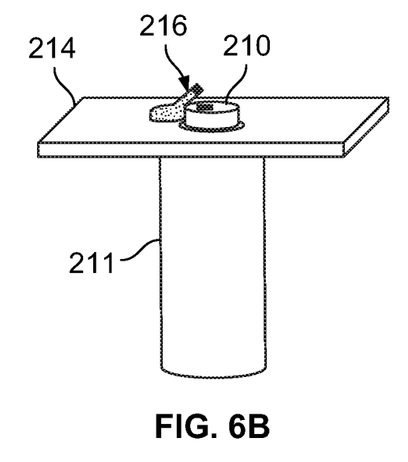
FIG. 6B is a perspective view of the busbar and terminal of FIG. 6A showing the thermal spray material partially melted.

FIGS. 6A and 6B illustrate an example of an interconnection between a busbar and a terminal having an application of thermal spray operating as a fuse. A terminal 210 is shown extending through a busbar 214. A thermal spray deposit 216 is shown securing the terminal 210 to the busbar 214 in FIG. 6A. In FIG. 6B, a portion of the thermal spray deposit 216 is shown disengaged with the terminal 210 such that the busbar 214 is not mechanically connected to the terminal 210. For example, an instantaneous mechanical disconnect of the thermal spray deposit 216 from the terminal 210 may result due to a high temperature change of the terminal 210, such as a power surge through the terminal 210. A slower or more constant temperature change of the terminal 210 may influence a slower melt disconnect of the thermal spray deposit 216 from the terminal 210.

A material of the thermal spray deposit 216 may be selected such that a melting point of the thermal spray deposit 216 corresponds to a battery cell 211 failure occurrence, such as a power surge associated with an amount of current flowing through the terminal 210 outside of a predetermined threshold. In these examples, the thermal spray deposit 216 may melt and operate as a fuse to terminate an electrical connection between the terminal 210 and the busbar 214. The predetermined threshold of the current may be selected based on characteristics of the battery cell 211, the terminal 210, and or the busbar 214. Optionally, a layer may be applied to a contact region between the terminal 210 and the busbar 214 to further assist in preventing electrical communication between the terminal 210 and the busbar 214 when the thermal spray deposit 216 melts. The layer may be, for example, of a material having dielectric properties.

Figure 7A:
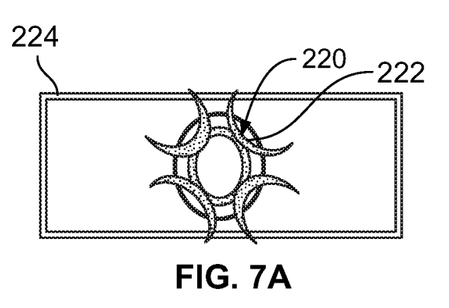
FIG. 7A is a top plan view of an example of a terminal secured to a busbar via an example of a patterned thermal spray deposit.
Figure 7B:
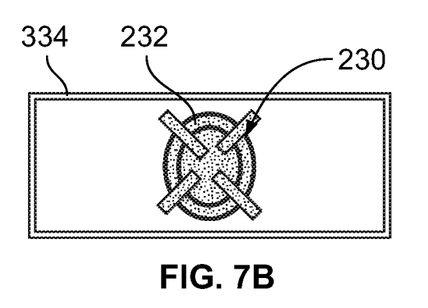
FIG. 7B is a top plan view of an example of a terminal secured to a busbar via another example of a patterned thermal spray deposit.
Figure 7C:
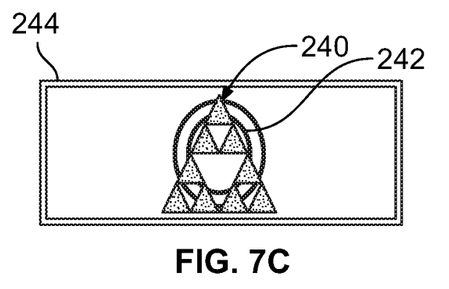
FIG. 7C is a top plan view of an example of a terminal secured to a busbar via another example of a patterned thermal spray deposit.
Figure 7D:
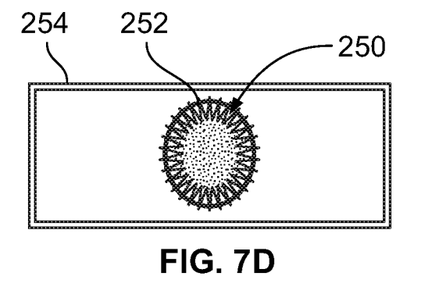
FIG. 7D is a top plan view of an example of a terminal secured to a busbar via yet another example of a patterned thermal spray deposit.

FIGS. 7A through 7D illustrate various patterns of the thermal spray that may be applied to an interconnection area between a busbar and a terminal. A shape of pattern may be selected based on desired mechanical connection properties of a busbar and battery cell. In one example, a nozzle of a thermal spray application apparatus may define a pattern corresponding to a desired pattern of thermal spray output upon the interconnection area. In FIG. 7A, a thermal spray pattern 220 is shown securing a terminal 222 to a busbar 224. In this example, the thermal spray pattern 220 is shaped to resemble a circle disposed between four crescent-moons with an opening located above a central portion of the terminal 222. In FIG. 7B, a thermal spray pattern 230 is shown securing a terminal 232 to a busbar 234. In this example, the thermal spray pattern 230 is shaped to resemble four rectangular sections defining an X-pattern with an opening located above a central portion of the terminal 232. In FIG. 7C, a thermal spray pattern 240 is shown securing a terminal 242 to a busbar 244. In this example, the thermal spray pattern 240 is shaped to resemble a collection of triangles adjacent one another with an opening located above a central portion of the terminal 242. In FIG. 7D, a thermal spray pattern 250 is shown securing a terminal 252 to a busbar 254. In this example, the thermal spray pattern 250 is shaped to resemble a circular burst.

Figure 8A:
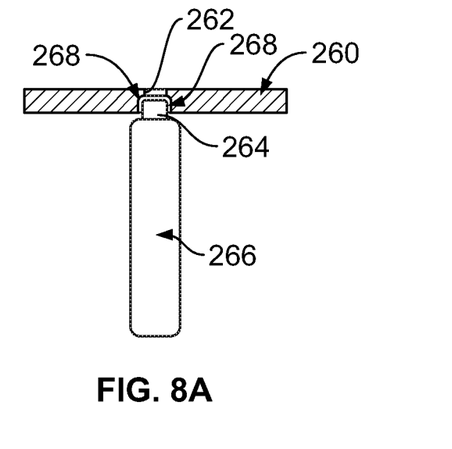
FIG. 8A is a front view, in cross-section, of an example of a battery cell and a busbar.
Figure 8B:
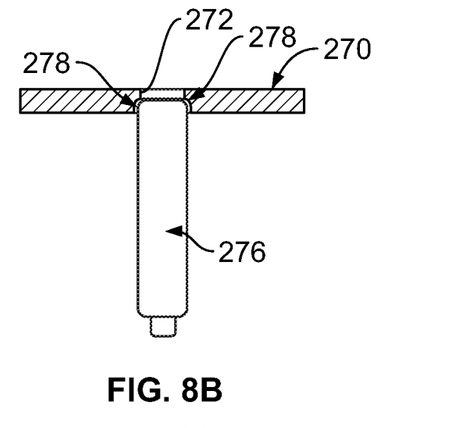
FIG. 8B is a front view, in cross-section, of another example of a battery cell and busbar.
Figure 8C:
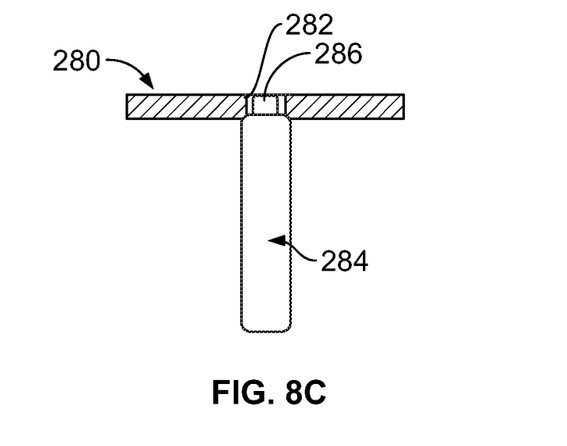
FIG. 8C is a front view, in cross-section, of yet another example of a battery cell and busbar.

FIGS. 8A through 8C illustrate examples of busbars for interconnecting with a cylindrical battery cell. Each of the busbars may include a through-hole having an irregular or regular arc-shape corresponding to a shape of a portion of a battery cell such as a cell case or terminal. A battery cell case, a terminal, or the busbar may be shaped to facilitate a snug fit or may be shaped such that a spacing is defined between the busbar and the cell case or terminal.

In FIG. 8A, a busbar 260 defines a through-hole 262 sized and shaped for receiving a terminal 264 of a battery cell 266. The busbar 260 defines the through-hole 262 such that a cutaway region 268 corresponds to an arc-shape of an upper portion of the terminal 264. Optionally, a thermal spray may be applied to secure the busbar 260 and the terminal 264 to one another.

In FIG. 8B, a busbar 270 defines a through-hole 272 sized and shaped for receiving a lower portion of a cylindrical battery cell 276. The busbar 270 defines the through-hole 272 such that a cutaway region 278 corresponds to an arc-shape of the lower portion of the cylindrical battery cell 276. Optionally, a thermal spray may be applied to secure the busbar 270 and the lower portion of the cylindrical battery cell 276 to one another.

In FIG. 8C, a busbar 280 defines a through-hole 282 sized and shaped for receiving an upper portion of a cylindrical battery cell 284 and a terminal 286 thereof. The busbar 280 defines the through-hole 282 such that a cutaway region 288 corresponds to an arc-shape of the upper portion of the cylindrical battery cell 284 and the terminal 286. Optionally, a thermal spray may be applied to assist in securing the busbar 280 to the terminal 286 and a portion of the cylindrical battery cell 284.

Figure 9A:
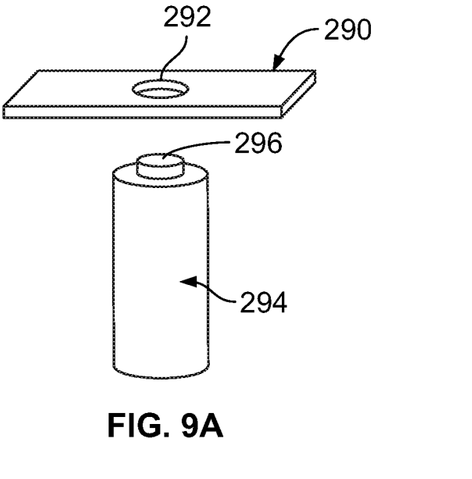
FIG. 9A is an exploded perspective view of an example of a battery cell and busbar.
Figure 9B:
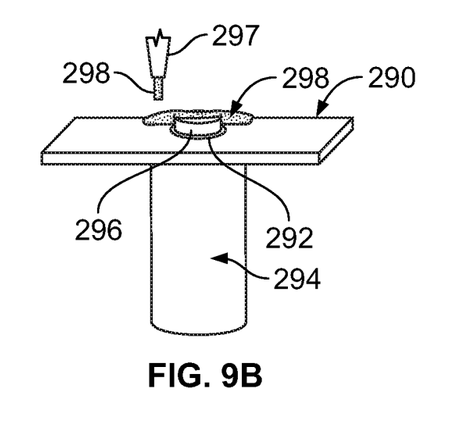
FIG. 9B is a perspective view of the battery cell and busbar of FIG. 9A shown secured to one another via an example of a thermal spray deposit.
Figure 9C:
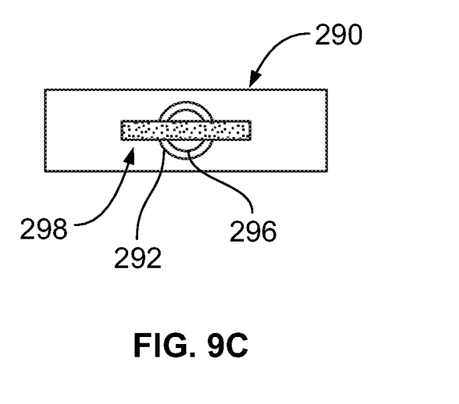
FIG. 9C is a top plan view of a terminal of the battery cell of FIG. 9A shown secured to the busbar of FIG. 9A via the example of the thermal spray deposit of FIG. 9B.

FIGS. 9A through 9C illustrate portions of a battery cell assembly having thermal spray applied on top of a terminal and busbar. In FIG. 9A, a busbar 290 defining a through-hole 292 is shown spaced from a battery cell 294 having a terminal 296. In FIG. 9B, a nozzle 297 and thermal spray 298 are shown along with the busbar 290 mounted to the battery cell 294. The thermal spray 298 is shown applied to the busbar 290 and the terminal 296. For example, the thermal spray 298 is applied to extend along a surface of the busbar 290 and the terminal 296 to secure the busbar 290 and the battery cell 294 to one another as further shown in a top plan view in FIG. 9C.

Figure 10A:
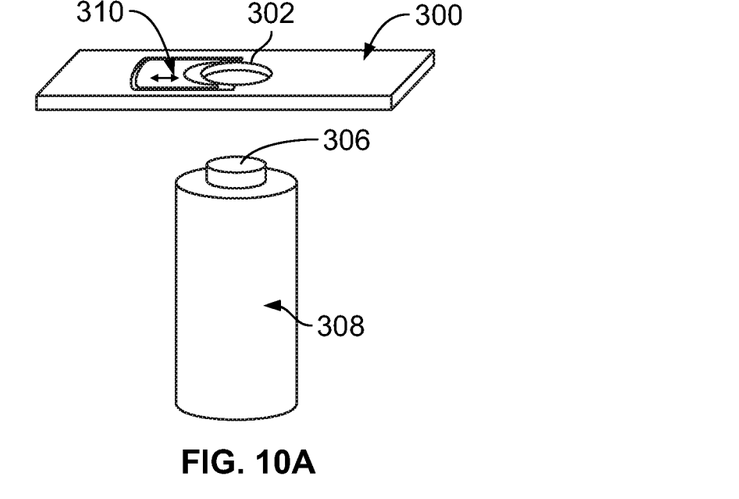
FIG. 10A is an exploded perspective view of an example of a battery cell and a busbar having an example of an alignment cap.
Figure 10B:
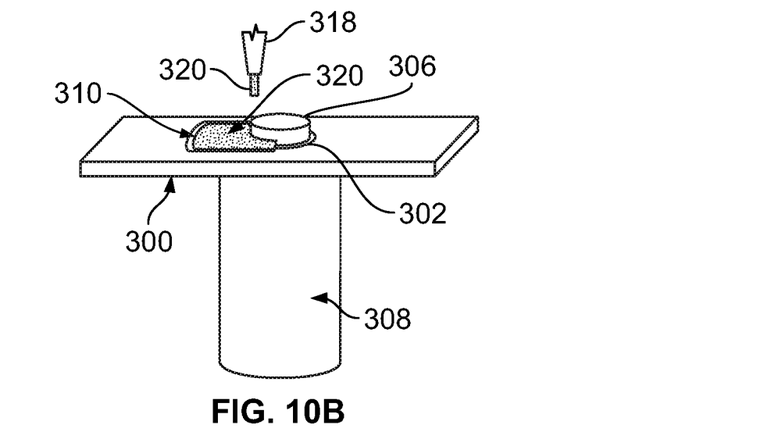
FIG. 10B is a perspective view of the example of the battery cell and busbar of FIG. 10A shown secured to one another via an example of a thermal spray deposit applied to the alignment cap of FIG. 10A and a terminal of the battery cell of FIG. 10A.
Figure 10C:
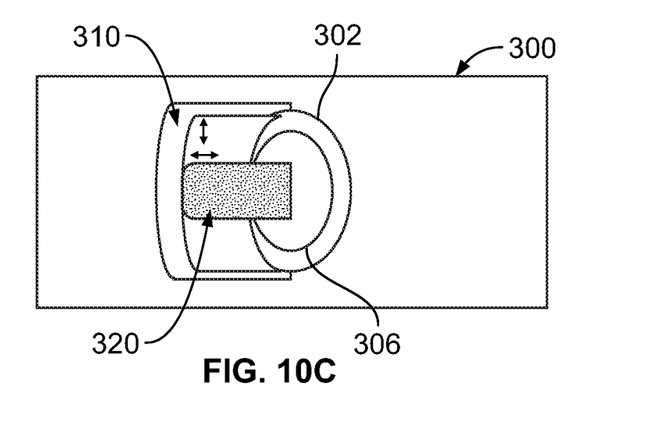
FIG. 10C is a top plan view showing the thermal spray deposit applied to the alignment cap and the terminal of the battery cell of FIG. 10A.

FIGS. 10A through 10C illustrate portions of a battery cell assembly having thermal spray applied external to or on top of an alignment cap and a battery cell terminal. A busbar 300 defines a through-hole 302 sized to receive a terminal 306 of a battery cell 308. The busbar 300 further includes an alignment cap 310 mounted for translation between at least two positions. The alignment cap 310 may translate to provide a tight mating relationship between the busbar 300 and the terminal 306. A nozzle 318 may then apply a thermal spray 320 to the alignment cap 310 and the terminal 306 to secure the busbar 300 to the battery cell 308 as shown in FIGS. 10B and 10C and such that the thermal spray 320 does not contact other portions of the busbar 300.

Components of the busbar assemblies described above may assist in reducing power usage and machine-tool costs in comparison to laser welding techniques, may assist in providing low-to-negligible applied heating to a cell-terminal interconnection, and may assist in providing a fusible link for electrical disconnect during operation outside of acceptable conditions for interconnect design and performance tuning.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle traction battery assembly comprising:
   a battery cell including a terminal having an angled taper upper portion extending therefrom;
   a busbar defining a through-hole having a taper defining an angle substantially opposite of the angled taper upper portion such that a cavity is defined therebetween when the terminal extends through the through-hole, wherein a smaller end of the taper is in direct contact with the terminal; and
   a thermal spray deposited within the cavity, mechanically bonding and electrically connecting the busbar to the terminal, and configured to melt responsive to a temperature associated with current flow through the terminal exceeding a predefined value.

2. The assembly of claim 1, wherein the thermal spray is formed from a metallic powder selected to include particles that deform and mechanically connect when accelerated to a speed of approximately 500mph or more to join the particles and form a bond securing the terminal to the busbar in a cold process without requiring heat.

3. The assembly of claim 2, wherein the particles of the metallic powder are iron, copper, aluminum, nickel, or magnesium.

4. The assembly of claim 1, wherein the thermal spray is deposited within the cavity such that an upper surface of the busbar and an upper surface of the deposited thermal spray are substantially flush within one another.

5. The assembly of claim 1, wherein the angled taper upper portion and the taper of the through-hole each define an angle of between zero and ninety degrees.

6. The assembly of claim 1, wherein the tapers are arranged with one another such that the busbar is spaced from an isolator block mounted to the battery cell when the terminal extends through the through-hole.

* * * * *